United States Patent
Shao et al.

(10) Patent No.: US 12,042,782 B2
(45) Date of Patent: Jul. 23, 2024

(54) POST-TREATMENT METHODS AND SYSTEMS FOR CORE-SHELL CATALYSTS

(71) Applicants: GUANGZHOU HKUST FOK YING TUNG RESEARCH INSTITUTE, Guangzhou (CN); THE HONG KONG UNIVERSITY OF SCIENCE AND TECHNOLOGY, Hong Kong (CN)

(72) Inventors: Minhua Shao, Hong Kong (CN); Hsi-Wen Wu, Hong Kong (CN)

(73) Assignees: GUANGZHOU HKUST FOK YING TUNG RESEARCH INSTITUTE, Guangzhou (CN); THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 17/282,033

(22) PCT Filed: Oct. 19, 2020

(86) PCT No.: PCT/CN2020/121822
§ 371 (c)(1),
(2) Date: Apr. 1, 2021

(87) PCT Pub. No.: WO2022/021617
PCT Pub. Date: Feb. 3, 2022

(65) Prior Publication Data
US 2023/0147818 A1    May 11, 2023

(30) Foreign Application Priority Data
Jul. 31, 2020 (CN) .................. 202010762267.X

(51) Int. Cl.
*B01J 23/40* (2006.01)
*B01J 23/72* (2006.01)
(Continued)

(52) U.S. Cl.
CPC ............... *B01J 23/40* (2013.01); *B01J 23/72* (2013.01); *B01J 35/00* (2013.01); *B01J 35/30* (2024.01)

(58) Field of Classification Search
CPC ............. B01J 23/40; B01J 23/72; B01J 35/02
(Continued)

(56) References Cited

U.S. PATENT DOCUMENTS

2009/0114061 A1    5/2009  Strasser et al.
2016/0359173 A1*  12/2016  Kaneko ............... C23C 18/1848
(Continued)

FOREIGN PATENT DOCUMENTS

CN    1962057 A    5/2007
CN    103748719 A  4/2014
(Continued)

OTHER PUBLICATIONS

English translation of the Written Opinion for PCT/CN2020/121822. (Year: 2021).*
(Continued)

*Primary Examiner* — Patricia L. Hailey
(74) *Attorney, Agent, or Firm* — Schmeiser, Olsen & Watts, LLP

(57) ABSTRACT

Provided is a post-treatment method and system for a core-shell catalyst, which relate to the field of fuel cell materials. The post-treatment method of the present disclosure includes the following steps: a core-shell catalyst is added into an electrolyte solution containing citric acid or ethylenediamine tetraacetic acid, a gas containing oxygen is introduced into the electrolyte solution followed by stirring for a predetermined reaction time, the open circuit potential of the reactor base is recorded during the reaction time, and the open circuit potential should stabilize at 0.90~1.0 V vs. RHE when the reaction is completed. The molar ratio of
(Continued)

Figure 1:
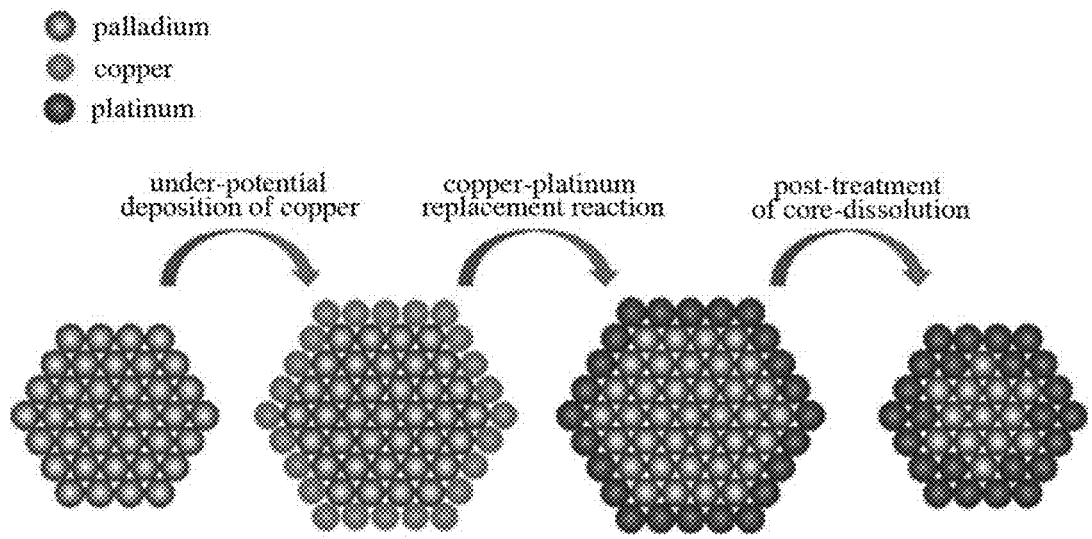

citric acid or ethylenediamine tetraacetic acid to platinum of the core-shell catalyst is 10 to 1000:1. A percentage of oxygen in the gas is 10 to 100% by volume. The post-treatment method of the present disclosure can significantly improve the platinum mass activity and PGM mass activity and durability of core-shell catalyst.

20 Claims, 1 Drawing Sheet

(51) Int. Cl.
  *B01J 35/00* (2024.01)
  *B01J 35/30* (2024.01)
(58) Field of Classification Search
  USPC .......................................................... 502/326
  See application file for complete search history.

(56) References Cited

U.S. PATENT DOCUMENTS

| | | | |
|---|---|---|---|
| 2017/0229713 A1* | 8/2017 | Hori | ........................ H01M 4/88 |
| 2020/0122123 A1 | 4/2020 | Matsutani et al. | |
| 2020/0346199 A1 | 11/2020 | Park et al. | |

FOREIGN PATENT DOCUMENTS

| | | | | |
|---|---|---|---|---|
| CN | 105209169 A | | 12/2015 | |
| CN | 108075144 A | | 5/2018 | |
| CN | 108385156 A | * | 8/2018 | ........... C25D 11/005 |
| CN | 109841856 A | | 6/2019 | |
| CN | 110114918 A | | 8/2019 | |
| CN | 111446458 A | | 7/2020 | |
| CN | 115275217 A | * | 11/2022 | .......... H01M 4/8867 |
| EP | 2 995 378 A1 | | 3/2016 | |
| JP | 2016128148 A | * | 7/2016 | .............. B01J 23/44 |
| JP | 2017029967 A | * | 2/2017 | .............. B01J 23/44 |
| TW | 202030022 A | | 8/2020 | |

OTHER PUBLICATIONS

PCT International Preliminary Report on Patentability mailed Jan. 31, 2023 corresponding to PCT International Application No. PCT/CN2020/121822.

PCT International Search Report & Written Opinion mailed Apr. 27, 2021 corresponding to PCT International Application No. PCT/CN2020/121822.

* cited by examiner

POST-TREATMENT METHODS AND SYSTEMS FOR CORE-SHELL CATALYSTS

CROSS-REFERENCE TO RELATED APPLICATIONS

This application claims priority to PCT Application No. PCT/CN2020/121822, having a filing date of Oct. 19, 2020, which is based on Chinese Application No. 202010762267.X, having a filing date of Jul. 31, 2020, the entire contents both of which are hereby incorporated by reference.

FIELD OF TECHNOLOGY

The following relates to the technical field of fuel cell materials, in particular to a post-treatment method and a system for a core-shell catalyst.

BACKGROUND

Proton exchange membrane fuel cell is an energy supply device which generates electricity by using small molecule fuels (such as hydrogen, methanol, etc.) and oxygen as reactants and the electrochemical reactions of these occur in membrane electrode assemblies (MEAs). Currently, most of the research and development of fuel cells for vehicles focuses on proton exchange membrane fuel cells that use hydrogen as fuel, as these cells have higher energy density, simpler reaction mechanism and faster reaction kinetics than those using other fuels. Hereinafter, the proton exchange membrane fuel cell (PEMFC) that uses hydrogen as fuel is referred to as fuel cell for short. The kinetics of the cathode electrochemical reaction, oxygen reduction reaction (ORR), in fuel cell is slow, and a large amount of catalyst is needed to maintain the device performance at a practical level. At present, most commercial fuel cells adopt carbon-supported platinum nanoparticles as catalyst, because platinum metal is the most effective element to catalyze the oxygen reduction reaction, and compared with other metals, platinum has better resistance to oxidation and corrosion. Therefore, by using carbon-supported platinum nanoparticles, a high power density and a long lifespan can be achieved for fuel cells. However, platinum is a precious metal with a high price, and its abundance in Earth's crust is low. Although the utilization rate of platinum catalyst can be improved in the form of nanoparticles, under the oxidizing operating conditions, platinum nanoparticles will gradually agglomerate, and this irreversibly decreases the power density output of the device.

How to reduce the platinum loading of fuel cell MEAs while maintaining the output power density of the cell and prolonging its life, has been the main research topic in the field of fuel cells nowadays. Focusing on the catalyst itself, new types of catalysts such as platinum alloys, core-shell structures, and single atom catalysts have appeared in succession, and their catalytic activities of platinum per unit weight are largely improved and hence are a crucial step towards large-scale commercialization of high-performance and low-platinum MEAs. Core-shell catalyst has a structure that comprises a core of non-platinum metal (such as palladium) or a compound (such as titanium nitride), and a shell of single layer or a few atomic layers of platinum. This special structure greatly increases the utilization rate of platinum atom, and the electronic effect and strain effect imposed by the core material on the platinum shell can improve the catalytic activity of the platinum shell towards ORR. The core material also alleviates the dissolution of the platinum shell by cathodic protection, and this helps slow down the catalyst particle agglomeration, and therefore extend the device service life.

The key for preparing core-shell catalysts is to precisely control the formation of the platinum shell. The uniformity in thickness and completeness of the shell will directly affect the activity and durability of the catalyst. The method of preparing platinum monolayer catalyst was first proposed by the Adzic group at Brookhaven National Laboratory in the United States, wherein a monolayer of template (such as lead, hydrogen, copper) was generated on the surface of core material nanoparticles (such as palladium, ruthenium, rhodium, gold, etc.) via under-potential deposition (UPD), and platinum ions were next introduced to replace the template monolayer in a surface-limited redox replacement reaction (SLRR) to form a shell of platinum monolayer. On the basis of the above reaction steps, a number of scale-up synthesis methods, and also methods to improve the performance of core-shell catalysts have been proposed. Using palladium or palladium alloys (such as palladium cobalt, palladium nickel) as the core, can effectively improve the catalytic activity of platinum monolayer. However, palladium, being one of platinum group metals (PGM), is rare and expensive. Post-treatment of a core-shell catalyst with a chemical or electrochemical method can dissolve a portion of the palladium core and repair the defects of the platinum shell, thereby effectively reducing the amount of palladium in the core-shell catalyst. The dissolved palladium can be recycled, purified, and reused to further reduce the cost of the catalyst.

On basis of the state-of-the-art synthesis method for core-shell catalysts, the PGM mass activity of the core-shell catalysts obtained via MEA single cell test is generally less than 0.35 A/mg, although higher than that of the commercial carbon-supported platinum nanoparticle catalysts, it is still not high enough to achieve large-scale commercialization, considering the cost of fuel cell vehicles. To further reduce the amount of precious metals in fuel cell vehicles, the PGM mass activity of catalyst must be further improved. Post-treatment is one of the methods to improve the PGM mass activity of core-shell catalyst. The ideal outcome from the post-treatment is to partially dissolve the palladium core and repair the pinhole defects, improving the completeness/integrity of the platinum shell, as shown in FIG. 1. Current chemical post-treatment methods mostly adopt ferric nitrate or ferric chloride in combination with potassium bromide to etch the palladium core under a heated (80~100° C.) oxidizing atmosphere. The degree of etching is highly sensitive to the concentration of ferric ions, and the overall process is difficult to control. Poorly controlled chemical etching post-treatment may destroy the core-shell structure, rendering low ORR activity and poor durability. In addition, the etching process involves multiple parameters such as the concentration of potassium bromide or other additives, the reaction temperature and so on. Besides, additional reactors and steps for chemical etching post-treatment are required. Using iron ions as an etchant, this post-treatment method is difficult to obtain reliable high-activity core-shell catalysts in scale-up synthesis. Electrochemical post-treatment methods utilize potential cycling (square wave, triangle wave) to partially dissolve the palladium core and repair pinholes on the platinum shell. Most of the electrochemical post-treatment methods require making an electrode with the core-shell catalyst, and then the electrode is connected to an electrochemical workstation to allow potential control in an acidic electrolyte under oxidizing atmosphere. This treatment method also requires additional reactors and reaction steps, and it is difficult to accurately control the potential, especially for batch synthesis. The above makes it difficult to achieve a commercial-scale production of high-quality core-shell catalyst at a low cost in electrochemical post-treatment methods.

SUMMARY

An aspect relates to a post-treatment method for core-shell catalysts. Embodiments of the invention can achieve a large scale post-treatment for core-shell catalysts, and the treated core-shell catalysts demonstrate an improved platinum mass activity and PGM mass activity.

A post-treatment method for a core-shell catalyst includes the following steps:

adding a core-shell catalyst into an electrolyte solution containing citric acid or ethylenediamine tetraacetic acid;

introducing a gas containing oxygen into the electrolyte solution under stirring for a predetermined reaction time; and recording an open circuit potential of the reactor base during the reaction time; wherein the open circuit potential is stabilized at around 0.90~1.0 V vs. RHE (reversible hydrogen electrode) at the end of reaction.

The molar ratio of the citric acid or ethylenediamine tetraacetic acid to platinum ion of the core-shell catalyst is 10 to 1000:1;

A percentage of oxygen in the oxygen-containing gas is 10% to 100% by volume.

In the above-mentioned post-treatment method for core-shell catalysts, the citrate or ethylenediamine tetraacetate anions provide selective adsorption on metals, where these anions adsorbed may be on a platinum surface, and adsorbed only weakly on the surface of other metals (such as palladium). Under the protection of citrate or ethylenediamine tetraacetate anions on the platinum shell in an acidic and oxidizing atmosphere, the rate for the core dissolution reaction is slow and controllable, and the platinum atoms on the shell are allowed to rearrange into a denser shell. In this manner, the core-shell structure can be maintained, and the platinum mass activity and PGM mass activity of the catalyst can be improved with a lower decay rate. Furthermore, the obtained core-shell catalyst demonstrates improved durability. The post-treatment method of the present disclosure belongs to a chemical method and is especially suitable for scale-up synthesis of core-shell catalysts, as it does not require changing of reactors and electrolytes or adding additional additives, achieving a reliable one-pot synthesis of high-quality core-shell catalysts.

In one example, the core-shell catalyst is selected from any one of palladium-platinum core-shell catalysts, ruthenium-platinum core-shell catalysts, and palladium-alloy-platinum core-shell catalysts.

In one example, the molar ratio of the citric acid or ethylenediamine tetraacetic acid to the platinum of the core-shell catalyst is 50~70:1.

In one example, the electrolyte solution is a copper sulfate solution.

In one example, the gas containing oxygen is air or pure oxygen.

In one example, the concentration of the citric acid or ethylenediamine tetraacetic acid is 5 to 50 mM. A suitable concentration of citric acid or ethylenediamine tetraacetic acid (5 to 50 mM) can inhibit the dissolution of the platinum shell when dissolving the palladium core. When the concentration of citric acid or ethylenediamine tetraacetic acid is lower than 5 mM, the protective effect on the platinum shell is very limited, resulting in the core to be exposed and a greatly reduced activity of the obtained catalyst.

In one example, the predetermined reaction time is 6 to 12 hours.

In one example, the post-treatment method further includes a purification step: after the reaction is completed, a suspension is filtered, and a solid is retained, washed, and dried to obtain a post-treated core-shell catalyst via core-dissolution. The purification step can remove most of the citrate anions, and the residual citrate anions that are adsorbed on the platinum surface can be desorbed or decomposed after cyclic voltammetric scans at a high and low potential cycling in the working environment of fuel cell without poisoning the catalyst.

In one example, the core-shell catalyst is obtained by a copper-platinum replacement reaction.

In one example, the copper-platinum replacement reaction specifically includes steps of:

STEP 1: placing a core material into a reactor, and then adding water to prepare a suspension, followed by adding sulfuric acid solution and stirring; subsequently, introducing an inert gas into the solution to remove oxygen in the reactor, and then introducing hydrogen to remove impurities adsorbed on the surface of the core material; after that, introducing an inert gas to remove hydrogen; introducing oxygen or air to remove the hydrogen embedded in the crystal lattice of core material; and finally introducing the inert gas to remove oxygen dissolved in the electrolyte solution;

STEP 2: continuously introducing the inert gas; stopping stirring the suspension to allow the settling of core materials; applying cyclic potential scans. The suspension is stirred for 10 to 70 seconds every 20 to 40 minutes of settling. The above scans are repeated until cyclic voltammetry curves are stable;

STEP 3: adding copper sulfate solution to the reactor, and meanwhile recording the open circuit potential; after that, stopping stirring to allow the material to settle, and maintaining constant potential; stirring for 10 to 70 seconds every 20 to 40 minutes of settling; the above is repeated until a current recorded is stable; and STEP 4: preparing a precursor solution containing platinum ions, citric acid, and sulfuric acid, and introducing the inert gas to obtain a platinum precursor solution; at the end of the constant potential hold, stopping the potential control, starting stirring, and adding the platinum precursor solution to the suspension in a drop-wise manner to allow copper-platinum replacement reaction; when the copper-platinum replacement reaction is completed, the solution is filtered and a solid is retained, washed, and dried to obtain a core-shell catalyst without core-dissolution.

In one example, the inert gas is argon or nitrogen.

In one example, the core material is carbon-supported palladium nanoparticles.

Another aspect relates to a post-treatment system for the core-shell catalyst, including:

a reactor, providing a compartment for post-treatment reactions of the core-shell catalyst to take place, wherein a stirrer is placed in the reactor;

an air supplying device, providing oxygen or pure oxygen to the reactor; and an electrochemical workstation, recording open circuit potential of the reactor base.

The above-mentioned system can achieve a large-scale post-treatment of core-shell catalyst with high efficiency, and the platinum mass activities and PGM mass activities of core-shell catalysts can be significantly improved.

Compared with the conventional art, the present disclosure has the following beneficial effects:

In the post-treatment method for a core-shell catalyst of the present disclosure, citrate anions or ethylenediamine tetraacetate anions provide protection for the platinum shell against the acidic and oxidizing environment. In this manner, the rate of core dissolution reaction is slow and controllable, and the platinum atoms on the shell rearrange to form a denser shell, allowing the maintaining of core-shell structure. The as-obtained core-shell catalyst demonstrates a PGM mass activity of 0.48 A/mg PGM and a platinum mass activity of 1.01 A/mg Pt, and the latter is 5 times that of the commercial carbon-supported platinum nanoparticle catalyst in the conventional art, showing a significant improvement for the mass activities. After accelerated stability test, the decay rate of mass activity for post-treated core-shell catalyst is only 22.3%, while the decay rate of mass activity for the commercial carbon-supported platinum nanoparticles in the same conditions is 55.7%. This clearly shows that the post-treated core-shell catalyst using the present disclosure has a smaller decay rate of mass activity and a much better durability The system of the present disclosure can be used for the preparation and post-treatment of the large-scale core-shell catalyst without changing reactors and electrolytes or adding additives, and allows reliable one-pot synthesis of high-quality core-shell catalysts.

BRIEF DESCRIPTION

Figure 2:
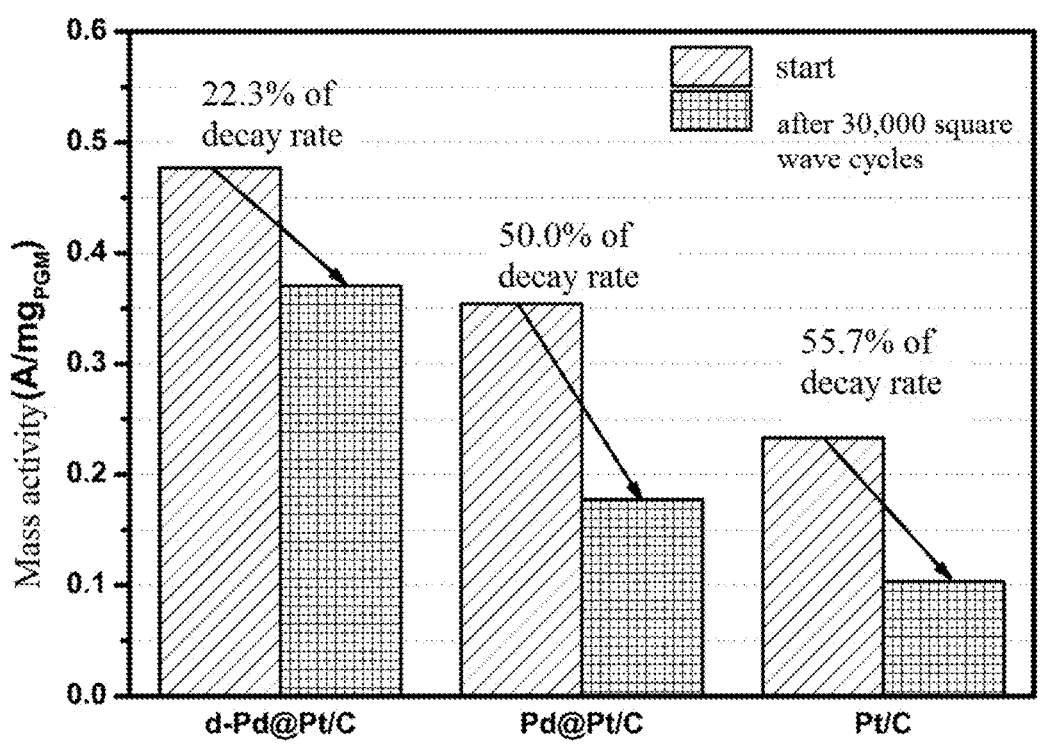

Some of the embodiments will be described in detail, with reference to the following figures, wherein like designations denote like members, wherein:

FIG. 1 is a schematic diagram of the synthesis and post-treatment reaction for the core-shell catalyst; and FIG. 2 shows the results of the mass activity tests and accelerated stability tests for post-treated core-shell catalysts.

DETAILED DESCRIPTION

Embodiments of the invention will be described hereinafter with reference to the preferred examples for the sake of clarity. However, the present disclosure can be implemented in many different forms and is not limited to the examples described herein. On the contrary, the objective of providing these examples is to understand the present disclosure more thoroughly and comprehensively.

All technical and scientific terms used herein have the general meanings well understood by those skilled in the art unless otherwise defined. The terms in the descriptions of the present disclosure have been presented for purposes of illustrating the examples, but not limited to the present disclosure. The term "and/or" used herein includes any and all combinations of one or more related listed items.

In the following examples, copper sulfate, potassium chloroplatinate, and citric acid are all purchased from Sigma-Aldrich™, and carbon-supported palladium nanoparticles are provided by Tanaka Precious Metals Co. Ltd.

Example 1

1. Preparation of Core-Shell Catalyst (1) 1000 mg carbon-supported palladium nanoparticles are placed into a glass bottle, and an appropriate amount of ultra-pure water is added to prepare a well-dispersed suspension. The mixture is poured into the reactor, and the glass bottle is rinsed with sulfuric acid solution, which is also poured into the reactor until the concentration of the sulfuric acid solution in the reactor is 50 mM with a total volume of 600 mL. Argon gas is introduced into the reactor for 30 minutes to remove oxygen, and then hydrogen gas is introduced for about 40 minutes to remove the impurities adsorbed on the surface of the palladium. Subsequently, argon gas is introduced for 30 minutes to remove hydrogen dissolved in the solution. In each step of introducing the gas, the suspension is stirred at 300 rpm. After this step is completed, argon or nitrogen gas is supplied to the reactor until the copper-platinum replacement reaction is completed.

(2) The stirring is stopped to allow the core material to settle naturally, and an electrochemical workstation is used to apply cyclic potential scans (0.36 to 0.45V vs. RHE reversible hydrogen electrode, 5 mV/s of scan rate, all the potentials are referred to RHE hereinafter) to the reactor base. During the potential scans, the solution is stirred at 300 rpm for 1 minute every 30 minutes, until the CV curve recorded by the workstation is stable. This step removes impurities and oxides on the surface of the core material by applying external power, and it usually takes 2 hours and the solution is stirred for more than 4 times. One hour before finishing the potential scans, a copper sulfate solution is prepared and its concentration is calculated according to the requirement that the concentration of copper ion is 50 mM after the addition of which. The copper sulfate solution is quickly added to the suspension with a peristaltic pump, and meanwhile the open circuit potential of the reactor base is recorded with an electrochemical workstation. After completion of addition of copper sulfate solution (open circuit potential normally stabilizes at about 0.64V), the stirring is stopped to allow the core material to settle naturally, and the electrochemical workstation is used to apply a constant potential hold at 0.36V, during which stirring is performed at 300 rpm for 1 minute every 30 minutes, until a current recorded by the workstation is stable.

(3) A precursor solution of platinum ions at a concentration of about 4 to 10 mM, citric acid at a concentration of about 0.2 M, and sulfuric acid at a concentration of 50 mM, is prepared, and argon gas is introduced in it for 30 minutes. When the constant potential hold step is completed, the potential control is stopped and stirring at 400 rpm commences, the platinum precursor solution is added slowly into the suspension in a drop-wise manner using a peristaltic pump to allow copper-platinum replacement reaction. The open circuit potential is recorded using an electrochemical workstation. The open circuit potential gradually increases with the addition of platinum ions. After completion of the addition of platinum precursor solution, the replacement reaction is allowed to proceed for an extra 40 minutes to ensure equilibrium.

(4) After the replacement reaction is completed, the catalyst is collected by filtration. The filtrate is the blue-colored copper sulfate aqueous solution. The catalyst is washed with ultra-pure water several times, and dried in vacuum to obtain the non-post-treated core-shell catalyst without core-dissolution.

2. Post-Treatment of Core-Shell Catalyst (1) After the copper-platinum replacement reaction is completed, air is introduced into an electrolyte solution containing citric acid (the molar ratio of citrate:platinum is about 60:1), wherein the concentration of citric acid is 40 mM. The solution is stirred for 12 h, during which the open circuit potential is recorded using an electrochemical station, and it normally stabilizes at 0.97V vs. RHE at the end of core-dissolution reaction.

(2) After the reaction is completed, the catalyst is collected via filtration, and the filtrate is yellow-green. The catalyst is washed several times with ultra-pure water, and dried in vacuum to obtain a post-treated core-shell catalyst via core-dissolution.

In this example, the palladium/platinum mass ratio of the non-post-treated core-shell catalyst (Pd@Pt) is 1.80, while the palladium/platinum mass ratio of the post-treated core-shell catalyst is 1.30.

Example 2

A preparation method and post-treatment method of the core-shell catalyst are the same as those in Example 1, except that in the post-treatment step, pure oxygen is introduced (the oxygen content is 99.9992%).

In this example, the palladium/platinum mass ratio of the non-post-treated core-shell catalyst (Pd@Pt) is 1.80, while the palladium/platinum mass ratio of the post-treated core-shell catalyst is 1.10.

Comparative Example 1

Commercial carbon-supported platinum nanoparticle catalyst is provided by Tanaka Precious Metals Co., Ltd., a renowned research and development manufacturer for fuel cell catalysts.

Comparative Example 2

A preparation method and post-treatment method of the core-shell catalyst are the same as those in Example 1, except that in the post-treatment step of the core-shell catalyst, citric acid is not added to the electrolyte solution.

Due to the lack of citric acid in the reaction system, the platinum shell is not protected by citrate and the obtained catalyst has its core exposed, ultimately resulting in a substantial decrease in ORR activity.

Comparative Example 3

A preparation method and post-treatment method of the core-shell catalyst are the same as those in Example 1, except that in the post-treatment step of the core-shell catalyst, the gas containing oxygen is not introduced, argon gas is introduced instead.

Under these reaction conditions, the platinum atoms does not rearrange and the pinhole defects on the shell is not repaired, resulting in an incomplete coating of the platinum shell and a part of the core to be exposed; the stability of the catalyst is not as good as that of the post-treated catalyst in an oxygen-containing atmosphere. This is reflected in the fact that the voltage loss of the MEAs prepared using the above catalyst is larger than that using the oxygen-containing gas post-treated catalyst in their lifespans. In addition, as more core palladium atoms are retained in an oxygen-free atmosphere and most of them are not involved in enhancing the ORR activity of the platinum shell, the overall PGM mass activity of the catalyst is not as good as that post-treated ones in oxygen-containing atmosphere.

Test Example 1

The catalysts of Example 1 and that of Comparative Example 1 are selected to test the activity of these catalysts under the same platinum loading in MEAs (0.05 mg/cm$^2$ in anode, 0.11 mg/cm$^2$ in cathode) via single cell test. Test conditions: hydrogen/oxygen, 80° C., 100% relative humidity, 5 cm$^2$ active area, 1.5 atm back pressure.

The platinum mass activity of the post-treated core-shell catalyst (d-Pd@Pt/C) reaches 1.01 A/mg Pt, and the PGM mass activity reaches 0.48 A/mg. The platinum mass activity of d-Pd@Pt/C is 5 times that of commercial carbon-supported platinum nanoparticles. The PGM mass activity of d-Pd@Pt/C has reached the Year 2020 performance target, set by the US Department of Energy (0.44 A/mg for PGM mass activity, using MEA single cell test method).

Test Example 2

The same accelerated stability test, established by the US Department of Energy, is conducted for MEAs using the non-post-treated catalyst (Pd@Pt/C) in Example 1, the post-treated catalyst in Example 2 (d-Pd@Pt/C) and the commercial carbon-supported platinum nanoparticle catalyst (Pt/C) in Comparative Example 1. The test conditions are described briefly as follows, hydrogen/nitrogen, 80° C., 100% relative humidity, 5 cm$^2$ active area, 1.5 atm back pressure, 0.1 mg/cm$^2$ of platinum loading, 30,000 square wave cycles, constant voltage at 0.60V and at 0.95V, 3-second hold time at each voltage. The test results are shown in FIG. 2. The decay rate of mass activity is 50.0% for Pd@Pt/C, 55.7% for Pt/C, while that for d-Pd@Pt/C, using the post-treatment method of the present disclosure, is only 22.3%. Moreover, the PGM mass activity of d-Pd@Pt/C at any stage of the accelerated stability test is significantly higher than that of the commercial carbon-supported platinum nanoparticle catalyst.

In summary, the post-treatment method of the core-shell catalyst in the present disclosure can achieve a simple, reliable and effective production of core-shell catalyst in gram-batch-size.

The technical features of the above-mentioned embodiments can be combined arbitrarily. In order to make the description concise, not all possible combinations of the various technical features in the above-mentioned embodiments are described. However, all combinations of these technical features should be considered to fall within the scope of this specification as long as they have no contradiction.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A post-treatment method for a core-shell catalyst, including steps of:
adding the core-shell catalyst into an electrolyte solution containing citric acid or ethylenediamine tetraacetic acid, wherein the core-shell catalyst contains platinum;
introducing a gas containing oxygen into the electrolyte solution followed by stirring and reacting for a predetermined reaction time; and
recording an open circuit potential during the reaction time,
wherein the open circuit potential is stable at 0.90 to 1.0 V vs. RHE when the reaction is completed;

wherein a molar ratio of citric acid or ethylenediamine tetraacetic acid to platinum of the core-shell catalyst is 10 to 1000:1; and wherein a percentage of oxygen in the gas is 10% to 100% by volume.

2. The post-treatment method for the core-shell catalyst according to claim 1, wherein the core-shell catalyst is selected from any one of palladium-platinum core-shell catalysts, ruthenium-platinum core-shell catalysts, and palladium-alloy-platinum core-shell catalysts.

3. The post-treatment method for the core-shell catalyst according to claim 2, wherein the core-shell catalyst is obtained by a copper-platinum replacement reaction.

4. The post-treatment method for the core-shell catalyst according to claim 3, wherein the copper-platinum replacement reaction specifically includes steps of:
STEP 1: placing a core material into a reactor, and adding water to prepare a suspension, and then adding sulfuric acid solution under stirring; subsequently, introducing an inert gas into the solution to remove oxygen in the reactor, and then introducing hydrogen to remove impurities adsorbed on the surface of the core material, after that, introducing an inert gas to remove hydrogen; introducing oxygen or air to remove the hydrogen embedded in the crystal lattice, and finally introducing the inert gas to remove oxygen dissolved in the solution;
STEP 2: continuously introducing the inert gas and then stopping stirring; after the core material settles, applying cyclic potential scans to the reactor base; stirring the suspension for 10 to 70 seconds every 20 to 40 minutes of settling; the above process is repeated until a cyclic voltammetric curve becomes stable;
STEP 3: adding a copper sulfate solution to the reactor, and meanwhile recording the open circuit potential; after that, stopping stirring to allow the material to settle, and applying a constant potential hold to the reactor base; stirring the suspension for 10 to 70 seconds every 20 to 40 minutes of settling; the above is repeated until a current recorded is stable; and
STEP 4: preparing a precursor solution containing platinum ions, citric acid, and sulfuric acid, and introducing an inert gas to obtain a platinum precursor solution; at the end of the constant potential hold, stopping potential control, starting stirring, and adding the platinum precursor solution in a drop-wise manner to allow a copper-platinum replacement reaction; when the copper-platinum replacement reaction is completed, the suspension is filtered, and a solid is retained, washed, and dried to obtain a core-shell catalyst without core-dissolution post-treatment.

5. The post-treatment method for the core-shell catalyst according to claim 1, wherein the electrolyte solution is a copper sulfate solution, the gas containing oxygen is air or pure oxygen.

6. The post-treatment method for the core-shell catalyst according to claim 5, wherein the core-shell catalyst is obtained by a copper-platinum replacement reaction.

7. The post-treatment method for the core-shell catalyst according to claim 6, wherein the copper-platinum replacement reaction specifically includes steps of:
STEP 1: placing a core material into a reactor, and adding water to prepare a suspension, and then adding sulfuric acid solution under stirring; subsequently, introducing an inert gas into the solution to remove oxygen in the reactor, and then introducing hydrogen to remove impurities adsorbed on the surface of the core material, after that, introducing an inert gas to remove hydrogen; introducing oxygen or air to remove the hydrogen embedded in the crystal lattice, and finally introducing the inert gas to remove oxygen dissolved in the solution;
STEP 2: continuously introducing the inert gas and then stopping stirring; after the core material settles, applying cyclic potential scans to the reactor base; stirring the suspension for 10 to 70 seconds every 20 to 40 minutes of settling; the above process is repeated until a cyclic voltammetric curve becomes stable;
STEP 3: adding a copper sulfate solution to the reactor, and meanwhile recording the open circuit potential; after that, stopping stirring to allow the material to settle, and applying a constant potential hold to the reactor base; stirring the suspension for 10 to 70 seconds every 20 to 40 minutes of settling; the above is repeated until a current recorded is stable; and
STEP 4: preparing a precursor solution containing platinum ions, citric acid, and sulfuric acid, and introducing an inert gas to obtain a platinum precursor solution; at the end of the constant potential hold, stopping potential control, starting stirring, and adding the platinum precursor solution in a drop-wise manner to allow a copper-platinum replacement reaction; when the copper-platinum replacement reaction is completed, the suspension is filtered, and a solid is retained, washed, and dried to obtain a core-shell catalyst without core-dissolution post-treatment.

8. The post-treatment method for the core-shell catalyst according to claim 1, wherein the concentration of the citric acid or ethylenediamine tetraacetic acid is 5 to 50 mM.

9. The post-treatment method for the core-shell catalyst according to claim 8, wherein the core-shell catalyst is obtained by a copper-platinum replacement reaction.

10. The post-treatment method for the core-shell catalyst according to claim 9, wherein the copper-platinum replacement reaction specifically includes steps of:
STEP 1: placing a core material into a reactor, and adding water to prepare a suspension, and then adding sulfuric acid solution under stirring; subsequently, introducing an inert gas into the solution to remove oxygen in the reactor, and then introducing hydrogen to remove impurities adsorbed on the surface of the core material, after that, introducing an inert gas to remove hydrogen; introducing oxygen or air to remove the hydrogen embedded in the crystal lattice, and finally introducing the inert gas to remove oxygen dissolved in the solution;
STEP 2: continuously introducing the inert gas and then stopping stirring; after the core material settles, applying cyclic potential scans to the reactor base; stirring the suspension for 10 to 70 seconds every 20 to 40 minutes of settling; the above process is repeated until a cyclic voltammetric curve becomes stable;
STEP 3: adding a copper sulfate solution to the reactor, and meanwhile recording the open circuit potential; after that, stopping stirring to allow the material to settle, and applying a constant potential hold to the reactor base; stirring the suspension for 10 to 70 seconds every 20 to 40 minutes of settling; the above is repeated until a current recorded is stable; and
STEP 4: preparing a precursor solution containing platinum ions, citric acid, and sulfuric acid, and introducing an inert gas to obtain a platinum precursor solution; at the end of the constant potential hold, stopping potential control, starting stirring, and adding the platinum precursor solution in a drop-wise manner to allow a copper-platinum replacement reaction; when the copper-platinum replacement reaction is completed, the suspension is filtered, and a solid is retained, washed, and dried to obtain a core-shell catalyst without core-dissolution post-treatment.

11. The post-treatment method for the core-shell catalyst according to claim 1, wherein the predetermined reaction time is 6 to 12 hours.

12. The post-treatment method for the core-shell catalyst according to claim 11, wherein the core-shell catalyst is obtained by a copper-platinum replacement reaction.

13. The post-treatment method for the core-shell catalyst according to claim 12, wherein the copper-platinum replacement reaction specifically includes steps of:
  STEP 1: placing a core material into a reactor, and adding water to prepare a suspension, and then adding sulfuric acid solution under stirring; subsequently, introducing an inert gas into the solution to remove oxygen in the reactor, and then introducing hydrogen to remove impurities adsorbed on the surface of the core material, after that, introducing an inert gas to remove hydrogen; introducing oxygen or air to remove the hydrogen embedded in the crystal lattice, and finally introducing the inert gas to remove oxygen dissolved in the solution;
  STEP 2: continuously introducing the inert gas and then stopping stirring; after the core material settles, applying cyclic potential scans to the reactor base; stirring the suspension for 10 to 70 seconds every 20 to 40 minutes of settling; the above process is repeated until a cyclic voltammetric curve becomes stable;
  STEP 3: adding a copper sulfate solution to the reactor, and meanwhile recording the open circuit potential; after that, stopping stirring to allow the material to settle, and applying a constant potential hold to the reactor base; stirring the suspension for 10 to 70 seconds every 20 to 40 minutes of settling; the above is repeated until a current recorded is stable; and
  STEP 4: preparing a precursor solution containing platinum ions, citric acid, and sulfuric acid, and introducing an inert gas to obtain a platinum precursor solution; at the end of the constant potential hold, stopping potential control, starting stirring, and adding the platinum precursor solution in a drop-wise manner to allow a copper-platinum replacement reaction; when the copper-platinum replacement reaction is completed, the suspension is filtered, and a solid is retained, washed, and dried to obtain a core-shell catalyst without core-dissolution post-treatment.

14. The post-treatment method for the core-shell catalyst according to claim 1, wherein the post-treatment method further includes a purification step: after the reaction is completed, a catalyst suspension is filtered, and a solid is retained, washed, and dried to obtain a post-treated core-shell catalyst via core-dissolution.

15. The post-treatment method for the core-shell catalyst according to claim 14, wherein the core-shell catalyst is obtained by a copper-platinum replacement reaction.

16. The post-treatment method for the core-shell catalyst according to claim 15, wherein the copper-platinum replacement reaction specifically includes steps of:
  STEP 1: placing a core material into a reactor, and adding water to prepare a suspension, and then adding sulfuric acid solution under stirring; subsequently, introducing an inert gas into the solution to remove oxygen in the reactor, and then introducing hydrogen to remove impurities adsorbed on the surface of the core material, after that, introducing an inert gas to remove hydrogen; introducing oxygen or air to remove the hydrogen embedded in the crystal lattice, and finally introducing the inert gas to remove oxygen dissolved in the solution;
  STEP 2: continuously introducing the inert gas and then stopping stirring; after the core material settles, applying cyclic potential scans to the reactor base; stirring the suspension for 10 to 70 seconds every 20 to 40 minutes of settling; the above process is repeated until a cyclic voltammetric curve becomes stable;
  STEP 3: adding a copper sulfate solution to the reactor, and meanwhile recording the open circuit potential; after that, stopping stirring to allow the material to settle, and applying a constant potential hold to the reactor base; stirring the suspension for 10 to 70 seconds every 20 to 40 minutes of settling; the above is repeated until a current recorded is stable; and
  STEP 4: preparing a precursor solution containing platinum ions, citric acid, and sulfuric acid, and introducing an inert gas to obtain a platinum precursor solution; at the end of the constant potential hold, stopping potential control, starting stirring, and adding the platinum precursor solution in a drop-wise manner to allow a copper-platinum replacement reaction; when the copper-platinum replacement reaction is completed, the suspension is filtered, and a solid is retained, washed, and dried to obtain a core-shell catalyst without core-dissolution post-treatment.

17. The post-treatment method for the core-shell catalyst according to claim 1, wherein the core-shell catalyst is obtained by a copper-platinum replacement reaction.

18. The post-treatment method for the core-shell catalyst according to claim 17, wherein the copper-platinum replacement reaction specifically includes steps of:
  STEP 1: placing a core material into a reactor, and adding water to prepare a suspension, and then adding sulfuric acid solution under stirring; subsequently, introducing an inert gas into the solution to remove oxygen in the reactor, and then introducing hydrogen to remove impurities adsorbed on the surface of the core material, after that, introducing an inert gas to remove hydrogen; introducing oxygen or air to remove the hydrogen embedded in the crystal lattice, and finally introducing the inert gas to remove oxygen dissolved in the solution;
  STEP 2: continuously introducing the inert gas and then stopping stirring; after the core material settles, applying cyclic potential scans to the reactor base; stirring the suspension for 10 to 70 seconds every 20 to 40 minutes of settling; the above process is repeated until a cyclic voltammetric curve becomes stable;
  STEP 3: adding a copper sulfate solution to the reactor, and meanwhile recording the open circuit potential; after that, stopping stirring to allow the material to settle, and applying a constant potential hold to the reactor base; stirring the suspension for 10 to 70 seconds every 20 to 40 minutes of settling; the above is repeated until a current recorded is stable; and
  STEP 4: preparing a precursor solution containing platinum ions, citric acid, and sulfuric acid, and introducing an inert gas to obtain a platinum precursor solution; at the end of the constant potential hold, stopping potential control, starting stirring, and adding the platinum precursor solution in a drop-wise manner to allow a copper-platinum replacement reaction; when the copper-platinum replacement reaction is completed, the suspension is filtered, and a solid is retained, washed, and dried to obtain a core-shell catalyst without core-dissolution post-treatment.

19. The post-treatment method for the core-shell catalyst according to claim 18, wherein the core material is carbon-supported palladium nanoparticles.

20. A post-treatment system for a core-shell catalyst, comprising:
   a reactor, providing a compartment for post-treatment reactions to take place, wherein a stirrer is placed in the reactor;
   an air supplying device, providing oxygen or pure oxygen to the reactor; and
   an electrochemical workstation, for recording an open circuit potential of a reactor base;
   wherein the post-treatment system is employed to treat the core-shell catalyst by applying the post-treatment method for the core-shell catalyst according to claim 1.

* * * * *